BAGASSE OR OTHER FIBROUS,
NON-WOODY, LIGNOCELLULOSIC
PLANT MATERIAL

MIX WITH SUFFICIENT WATER, SULFITE COMPOUND LIGNOCELLULOSE

PULPING AGENT, AND BUFFER TO FORM A MIXTURE CHARACTERIZED

BY:

| | |
|---|---|
| LIQUOR TO OVEN DRY PLANT MATERIAL RATIO | 2-15:1 |
| PULPING AGENT USE, DRY PLANT MATERIAL BASIS (AS $Na_2SO_3$) | 8-25% |
| pH THROUGHOUT PULPING, AT LEAST | 4 |

HEAT MIXTURE UNDER PRESSURE TO 130-200° C. OVER A TIME

PERIOD OF UP TO 60 MINUTES

MAINTAIN MIXTURE UNDER PRESSURE AT 130-200° C. FOR FROM 3- 60 MINUTES

PULP PRODUCT

SAMUEL B. KNAPP
JAMES D. WETHERN
*INVENTORS.*

BY *Eugene D. Farley*

ATTY.

United States Patent Office 2,924,547
Patented Feb. 9, 1960

2,924,547

RAPID NEUTRAL SULFITE PROCESS FOR PULPING BAGASSE AND OTHER NON-WOODY PLANT LIGNOCELLULOSE

Samuel B. Knapp, Washougal, and James D. Wethern, Camas, Wash., assignors, by mesne assignments, to Hawaiian Development Company, Ltd., Honolulu, Hawaii, a corporation of Hawaii Application November 8, 1954, Serial No. 467,363

14 Claims. (Cl. 162—83)

This invention relates to a rapid process for the pulping by a modified neutral sulfite procedure of bagasse and other fibrous, non-woody, lignocellulose-containing plant materials.

As is well known, the sulfite procedures for pulping lignocellulose fall into two broad classes, i.e., the acid sulfite process and the neutral sulfite process. In the acid sulfite process the lignocellulose usually is cooked in an aqueous medium containing a bisulfite of sodium, ammonium, magnesium, or calcium in the presence of free sulfur dioxide, i.e. sulfur dioxide which is not combined with the above bases to form the corresponding sulfite or bisulfites. The mixture throughout and after cooking is highly acid, having a pH of from 1–3, usually from 1–2.

In the neutral sulfite pulping procedure the lignocellulose is cooked in aqueous medium with the sulfites and/or bisulfites of the foregoing bases, but in the absence of an appreciable quantity of free sulfur dioxide. In some cases, a suitable alkaline material may be included to impart to the mixture a pH value during cooking of from 4 to 12. Thus, although the cooking liquor is not strictly neutral, it is substantially less acid than is the liquor used in the acid sulfite process. It is to the neutral sulfite process that the present invention pertains.

Bagasse heretofore has been pulped by a neutral sulfite process, but using strenuous cooking conditions over a protracted cooking period, this having been thought essential for the production of a pulp of commercial quality. Thus, in a typical prior art commercial neutral sulfite pulping procedure, the bagasse first is comminuted, if necessary, and mixed with water and the pulping chemicals to form a mixture of the desired composition and acidity. This mixture then is introduced into a pressure vessel and the temperature and pressure gradually increased to 140–180° C. and substantially corresponding pressures over a time period of from 1 to 4 hours.

The mixture is maintained at the chosen temperature and pressure for a cooking period of from 4 to 30 hours. It then may be discharged from the pressure vessel at the cooking pressure. In the alternative, the pressure first may be released gradually over a gassing-off period of up to 2 hours, the temperature of the mixture during this period corresponding to the pressure in the pressure vessel, after which it is discharged.

The present invention is predicated upon the discovery that by carefully controlling the reaction conditions between predetermined limits the cooking period required for the neutral sulfite pulping of bagasse and like plant materials may be reduced very materially to an over-all period of not over about 2 hours, as opposed to a conventional over-all period of the order of 5–25 hours. The application of such a short cooking period prevents the degradation of the cellulose and at the same time produces a pulp which is exceptionally strong, in part because of its relatively high content of pentosans.

Also, it produces a pulp which may be bleached readily to a very high brightness value without loss of strength. Still further, it results in a very high production rate because of the short cooking time required. In fact, the process may even be carried out successfully as a continuous process wherein the digestion step comprises a flash heating of the plant material in the presence of the pulping chemicals.

It therefore is the general object of this invention to provide a rapid neutral sulfite process for pulping fibrous, non-woody, lignocellulosic plant materials, such as sugar cane bagasse.

It is another object of this invention to provide a simple process for the neutral sulfite pulping of bagasse and other agricultural residues by subjecting the fibrous raw material to the action of the pulping chemical for an extremely short period of time to produce a pulp of commercial quality without the necessity of subjecting it to a subsequent mechanical defibering step.

It is another object of this invention to provide a neutral sulfite process of cooking bagasse and like plant materials rapidly and economically to produce pulps which are suitable for conversion to boards, coarse wrapping papers, and fine quality unbleached or bleached papers.

It is still another object of this invention to provide a rapid neutral sulfite process of preparing pulp from bagasse and other plant materials of similar character which pulp may be bleached readily by conventional procedures without loss of pulp strength.

It is still a further object of this invention to provide a rapid neutral sulfite process of cooking lignocellulose plant materials which may be applied to such materials as straw to produce a pulp suitable for the manufacture of fine quality papers substantially free of specks derived from the nodes of the straw.

Considering the foregoing in greater detail and with particular reference to the drawing comprising a flow plan of the procedure of this invention:

The presently described process may be applied to lignocellulosic plant materials derived from a variety of sources. Thus, although it is described herein with particular reference to sugar cane bagasse, it also is applicable to cereal straws, cornstalks, grasses and other agricultural residues derived from the processing of fibrous, non-woody lignocellulosic plants. Where bagasse is the starting material it may comprise either the whole or depithed product.

The plant material, whatever its source, may be reduced to the form of small pieces or shreds. Such a size reduction may occur during prior processing steps when the plant material is a residue from commercial operations. In other cases, however, it may be reduced in size, if necessary, by cutting or milling it in a separate operation in apparatus of suitable construction and design.

The comminuted plant material next is placed in a closed type digester or any other suitable pressure vessel and mixed with the aqueous digesting liquor containing the pulping chemicals. These comprise broadly, the sulfite lignocellulose pulping agent and, optionally, an alkaline material employed to maintain the pH of the cooking liquor throughout the cooking operation at a value of at least 4. In the alternative, however, the plant material may be mixed with the liquor in a mixing vessel, and the resulting mixture then introduced into a pressure vessel.

The sulfite lignocellulose pulping agent comprises a sulfite compound, i.e., a sulfite or bisulfite, of sodium, potassium, ammonium, magnesium, or calcium. These may be used singly or in admixture with each other with the exception that calcium sulfite or bisulfite are used preferably in conjunction with one or more of the other pulping agents. The pulping agent is employed in amount sufficient to establish a pulping agent use, on a dry plant material weight basis, calculated as $Na_2SO_3$, of broadly 8–25% and, preferably, 8–15%.

A wide variety of alkaline compounds may be used. Preferred alkaline materials to be used for this purpose comprise however the oxides, hydroxides, bicarbonates, and carbonates of sodium, potassium, ammonium, magnesium and calcium. These may be used singly or in admixture with each other or with other alkaline materials in amount sufficient to establish and maintain a pH of at least 4, preferably at least 7, throughout the cooking operation.

Thus, exemplary cooking liquors suitable for application in the presently described process contain sufficient sulfite compound lignocellulose pulping agent to provide from 8–25% by weight of that agent, expressed as $Na_2SO_3$, together with from 0–6% sodium hydroxide or from 0–8% of either sodium carbonate or sodium bicarbonate. Preferably, from 8–15% by weight sulfite compound lignocellulose pulping agent, expressed as sodium sulfite, buffered with from 1–4% sodium hydroxide, or 1–6% sodium carbonate, or 3–7% sodium bicarbonate, are employed. It will be appreciated that in determining the foregoing ratios of pulping agent to alkaline material, a lesser quantity of alkaline material is required when a large amount of pulping agent is used, and vice versa.

Sufficient water is employed together with the lignocellulosic plant material, the pulping agent, and the alkaline material, to produce a liquor to oven-dry plant material ratio of 2–15:1, i.e. from 2:1 to 15:1. However, when whole bagasse is employed as a starting material a liquor to oven-dry bagasse ratio of 4–10:1 is preferred. When depithed bagasse is employed, a liquor to oven-dry bagasse ratio of 2–7:1 is preferred.

The pulping mixture in the digester is heated over a rise time of up to 60 minutes, preferably from 1 second to 30 minutes. At the end of this rise time a cooking temperature of from 130–200° C., preferably from 150–180° C. is reached. Also, the pressure developed rises to a broad value of 25–240 p.s.i.g. depending upon the temperature and the pressure developed because of the hydrostatic pressure and the release of non-condensable gases during the digestion period.

The lower limits of temperature and pressure are those required to effectuate a substantial pulping of the lignocellulosic plant material within the longer stipulated time period. The higher limits of pressure and temperature are those applicable during the shorter stipulated time period and are determined by the fact that competitive reactions occur during pulping; one being the desired digestion of the lignocellulose, and the other the undesirable charring of the lignocellulose. Also, under the more strenuous reaction conditions there is an interfering conversion of the sulfite pulping agent to sulfur, sulfates and thiosulfates.

The charge is maintained under pressure at the stipulated cooking temperature for a digestion period of broadly from 3–60 minutes, preferably from 10–60 minutes. During this period the major proportion of the lignin is separated from the carbohydrate fraction of the lignicellulose to provide a cellulose pulp.

After the digestion period has been completed, the charge may be blown at the cooking pressure, or, optionally, the pressure may be reduced to any desired level and the contents of the digester blown or dumped into the receiving vessel.

The time required for such pressure reduction, i.e., the gas-off time, in any event is kept at a minimum and may be substantially instantaneous. Thus, it may occur over a time period of broadly up to 15 minutes, preferably of up to 5 minutes. During this time the temperature of the charge decreases to the level which substantially corresponds to the blowing pressure employed.

The pulp product discharged into the receiving vessel is ready for further processing by conventional post-pulping procedures. Thus, it may be separated from the cooking liquor, washed and bleached in the usual manner and then used in the manufacture of boards, coarse papers, or fine quality papers, without being subjected to an additional mechanical defibering treatment, such as disc-refining.

The presently described neutral sulfite process for the rapid pulping of bagasse and similar lignocellulosic plant materials is further illustrated in the following examples.

EXAMPLE I

Six kilograms of depithed bagasse (oven-dry basis) was charged into a 2.5 cubic foot stainless steel digester. The digester was steam jacketed and had one hollow trunnion fitted so that steam or cooking liquor could be admitted directly to the charge during the cooking if desired. The digester was motor driven through a gear and chain train and could be tumbled at the rate of one revolution every 3 minutes.

The cooking liquor was introduced into the digester in such a manner as to wilt the bagasse during the charging period. Sufficient liquor was employed to give a chemical use of 12% sodium monosulfite (calculated as $Na_2SO_3$) and 3% sodium hydroxide, based on the oven-dry bagasse, and a liquor to oven-dry bagasse ratio of 4:1. The initial pH of the liquor was 12.4.

The digester was capped and its rotation initiated for agitation of the contents. The shell steam was turned on at a controlled rate to give approximately a linear rise to maximum temperature. At the end of 15 minutes the digester was gassed-off briefly. The temperature of the mixture was increased to 180° C. over a total period of 60 minutes, the maximum pressure being 135 p.s.i.g. It then was held at this temperature and pressure for 10 minutes.

At the end of this time the digester was stopped and connected to the blow line. The blow valve was opened immediately and the cook blown to the blow tank. The total elapsed time thus was 70 minutes of which only 10 minutes were at the maximum cooking temperature of 180° C.

The pH of the final pulping liquor was 9.3 at room temperature. The pulp it contained was a fully cooked chemical pulp. It was separated from the liquor and washed, whereupon it was suitable for use in making paper by conventional papermaking procedures. The total pulp yield was 66.8% of the original oven-dry weight of the bagasse. Its pentosan content was 33.3% by weight and it was readily bleachable by the conventional chlorine-caustic-hypochlorite process to a high level of brightness.

A control pulp was prepared by cooking bagasse with the same pulping chemicals and under the same conditions as above except that a conventional cooking cycle was employed. This comprised heating the pulping mixture to 180° C. and 135 p.s.i.g. over a rise time of 2 hours, maintaining it at this temperature and pressure for 5 hours, and reducing the pressure to 80 p.s.i.g. over a time period of 15 minutes, the temperature being reduced correspondingly. The pulped product then was discharged from the digester. The total yield of pulp was 62.8%. A comparison of the properties of the pulps thus obtained is given in Table I.

Table I

|  | Present Process Pulp [1] | | Control Pulp [1] | |
| --- | --- | --- | --- | --- |
|  | Unbleached | Bleached | Unbleached | Bleached |
| Yield, percent | 66.8 | 61.7 | 62.8 | 57.9 |
| Brightness, at 460 mµ | 46.1 | 88.2 | 39.8 | 82.6 |
| Mullen bursting strength [2] | 103 | 110 | 98 | 91 |
| Tearing resistance [2] | 119 | 116 | 105 | 101 |
| Folding endurance, M.I.T. [2] | 782 | 904 | 508 | 463 |
| Breaking length, meters [2] | 9,050 | 9,100 | 8,750 | 8,700 |

[1] Bleached in three stages consisting of chlorination, caustic extraction and hypochlorite and using a total of 3.1% chlorine and 1% sodium hydroxide in the caustic extraction, both based on oven-dry bagasse.
[2] After beating to 200 cc. C.S.F.

EXAMPLE II

The procedure of Example I was repeated, using whole bagasse instead of the depithed product. The pulping chemicals comprised 10% sodium monosulfite (calculated as $Na_2SO_3$) and 5% sodium carbonate, based on the oven-dry weight of the bagasse. The liquor to oven-dry bagasse ratio was 6:1.

The mixture was brought to a temperature of 170° C. and a pressure of 110 p.s.i.g. over a time period of 60 minutes. It then was held at that temperature and pressure for a digestion period of 30 minutes, after which it was discharged immediately. The final pH of the liquor was 8.1 and the total pulp yield was 60.1%.

EXAMPLE III

The procedure of Example I again was followed using wheat straw as the starting material rather than bagasse. The pulping chemicals comprised 12% sodium monosulfite, calculated as $Na_2SO_3$. The mixture also contained 3% sodium hydroxide, based on the oven-dry weight of the straw. The liquor-oven dry straw ratio was 6:1.

The pulping mixture was brought to a temperature of 170° C. and a pressure of 105 p.s.i.g. over a rise time of 5 minutes. Thereafter it was maintained at this temperature and pressure for a digestion period of 15 minutes, after which it was discharged immediately from the digester. The final pH of the pulping liquor was 7.8 and the total pulp yield was 54.7% by weight.

Observation of the pulp product indicated that the nodes of the straw stems were not completely cooked during the short cooking period. As a result they could be removed easily from the pulp by a conventional screening operation.

The pulp product obtained thus was well suited for the manufacture of fine quality papers. It was readily bleachable by the conventional chlorine-caustic-hypochlorite treatment to give a white product. When converted to paper, the product was substantially free of specks derived from the nodes of the straw. This is in sharp contrast to the results obtained when making paper from pulp prepared by cooking straw using the conventional neutral sulfite pulping procedures where, because of the long cooking time, the straw nodes are digested sufficiently so that they pass through fine screens and are visible in the form of shiny specks in the final sheet of paper.

EXAMPLE IV

The procedure of Example I again was repeated using as a starting material 6 kilograms of depithed bagasse. Sodium monosulfite was used as the pulping chemical, no added alkaline material whatsoever being employed. The sulfite content of the liquor was 15%, calculated as $Na_2SO_3$. The liquor-oven dry bagasse ratio was 4:1.

The pulping mixture was brought to a maximum temperature of 170° C. and a maximum pressure of 100 p.s.i.g. over a rise time of 30 minutes. It was maintained at this temperature and pressure for a digestion time of 60 minutes. Thereafter it was blown immediately from the digester.

The final pH of the pulping liquor was 6.3. The total pulp yield was 64.9% by weight and the pulped product was a fully cooked chemical pulp suitable for use in the manufacture of fine quality boards and papers.

EXAMPLE V

The procedure of Example I again was followed using 6 kilograms of depithed bagasse as the raw material. The pulping chemical was ammonium monosulfite. It was used in amount sufficient to produce a sulfite concentration in the pulping liquor of 11.1%, calculated as $(NH_4)_2SO_3$. 2.6% by weight ammonium hydroxide was used as an alkaline material. The liquor-oven dry bagasse ratio was 6:1.

The pulping mixture was heated to a maximum temperature of 175° C. and a maximum pressure of 135 p.s.i.g. over a rise time of 30 minutes. It was held at this level for a digestion period of 60 minutes. It then was discharged immediately from the digester. The final pH of the pulping liquor was 6.2 and the total yield of pulp was 64.1% by weight.

Thus it will be apparent that by the process of the present invention we have provided a means for cooking sugar cane bagasse and like lignocellulosic plant materials to a fully cooked chemical pulp of superior properties using a cooking period which is but a fraction of that formerly employed in the neutral sulfite cooking process. As is apparent from Table I, the resultant pulp is superior in yield, brightness, strength and bleachability to pulp prepared by the conventional procedure in spite of the short cooking period. Accordingly, a very substantial increase in production of pulp is obtainable from plant equipment of a given capacity. Also, the use of the pulping chemicals may be maintained at a minimum, thereby making possible substantial additional economies.

Having thus described our invention in preferred embodiments we claim:

1. In the neutral sulfite process for pulping fibrous, non-woody, lignocellulosic plant materials with an aqueous pulping liquor containing a sulfite compound lignocellulose pulping agent to produce a papermaking pulp, the improvement which comprises limiting to a time of up to 60 minutes the rise time period employed for heating the mixture of plant material and pulping liquor to digestion temperature, and maintaining the mixture at said digestion temperature over a digestion time period of from 3 to 60 minutes.

2. The process of claim 1 wherein the pulping agent comprises a sulfite compound of an alkali metal.

3. The process of claim 1 wherein the pulping agent comprises a sulfite compound of sodium.

4. The process of claim 1 wherein the pulping agent comprises sodium monosulfite.

5. The process of claim 1 wherein the pulping agent comprises a sulfite compound of ammonium.

6. The process of claim 1 wherein the pulping agent comprises ammonium monosulfite.

7. The process of claim 1 wherein the plant material comprises sugar cane bagasse.

8. The process of claim 1 wherein the plant material comprises depithed sugar cane bagasse.

9. The process of claim 1 wherein the plant material comprises cereal straw.

10. The process of claim 1 wherein the heating rise time is from 1 second to 30 minutes.

11. The process of claim 1 wherein the digestion time period is from 10 to 60 minutes.

12. The process of claim 1 wherein the rise time period employed for heating the mixture to digestion temperature is limited to a time of from 1 second to 30 minutes and wherein the mixture is maintained at digestion temperature over a digestion time period of from 10 to 60 minutes.

13. In the neutral sulfite process for pulping sugar cane bagasse with an aqueous pulping liquor containing a sulfite compound lignocellulose pulping agent to produce a papermaking pulp, the improvement which comprises limiting to a time of from 1 second to 30 minutes the rise time period employed for heating the mixture of plant material and pulping liquor to digestion temperature, and maintaining the mixture at said digestion temperature over a digestion time period of from 10 to 60 minutes.

14. The process of claim 13 wherein the pulping agent comprises sodium monosulfite.

References Cited in the file of this patent

UNITED STATES PATENTS 260,749    Ekman _____ July 11, 1882

(Other references on following page)

UNITED STATES PATENTS

| | | | |
|---|---|---|---|
| 1,229,422 | Drewsen | June 12, | 1917 |
| 1,244,525 | Marusawa | Oct. 30, | 1917 |
| 1,387,441 | Braun | Aug. 9, | 1921 |
| 1,679,441 | Nanji | Aug. 7, | 1928 |
| 1,782,755 | Williams | Nov. 25, | 1930 |
| 1,830,421 | Bradley et al. | Nov. 3, | 1931 |
| 1,891,337 | Seaman | Dec. 20, | 1932 |
| 1,959,734 | Palazzo et al. | May 22, | 1934 |
| 2,018,490 | Jones | Oct. 22, | 1935 |
| 2,029,973 | Wells | Feb. 4, | 1936 |
| 2,528,351 | Farber | Oct. 31, | 1950 |
| 2,674,575 | Lewis et al. | Apr. 6, | 1954 |

OTHER REFERENCES

Casey: Pulp Paper, volume I, published by Interscience publishers, N.Y., 1952, pages 237–239.

Whittemore et al.: National Bureau of Standards, misc. pub. M148, pages 1–4 (1935).

Bhat: Indian Pulp and Paper, August 1953 (reprint), pages 1–3.